(12) United States Patent
Schadt (10) Patent No.: US 9,133,920 B2
(45) Date of Patent: Sep. 15, 2015

(54) APPARATUS AND METHOD OF CONTROLLING AN AUTOMATIC TRANSMISSION THROTTLE VALVE

(71) Applicant: Jeffrey Graham Schadt, Plano, TX (US)

(72) Inventor: Jeffrey Graham Schadt, Plano, TX (US)

( * ) Notice: Subject to any disclaimer, the term of this patent is extended or adjusted under 35 U.S.C. 154(b) by 431 days.

(21) Appl. No.: 13/630,218

(22) Filed: Sep. 28, 2012

(65) Prior Publication Data
US 2014/0090494 A1 Apr. 3, 2014

(51) Int. Cl.
F16H 21/18 (2006.01)
F16H 59/24 (2006.01)
F02D 11/04 (2006.01)

(52) U.S. Cl.
CPC .............. *F16H 21/18* (2013.01); *F02D 11/04* (2013.01); *F16H 59/24* (2013.01); *Y10T 74/18304* (2015.01)

(58) Field of Classification Search
CPC .......... F02D 9/10; F02D 9/1065; F02D 9/107
USPC ....................... 74/56; 123/337, 352, 360, 363
See application file for complete search history.

(56) References Cited

U.S. PATENT DOCUMENTS

| | | | | |
|---|---|---|---|---|
| 2,287,704 | A * | 6/1942 | Oberg | 74/513 |
| 2,762,615 | A * | 9/1956 | Cedarholm | 261/69.1 |
| 3,837,322 | A * | 9/1974 | Shishido et al. | 123/274 |
| 4,631,983 | A | 12/1986 | Morisawa | |
| 4,711,140 | A | 12/1987 | Younger | |
| 5,046,380 | A | 9/1991 | Matsumoto | |
| 5,165,298 | A * | 11/1992 | Shier et al. | 74/502.6 |
| 5,727,425 | A | 3/1998 | Lee | |
| 6,178,948 | B1 * | 1/2001 | Garrick et al. | 123/400 |
| 6,855,091 | B1 | 2/2005 | Holmes | |
| 7,023,200 | B2 * | 4/2006 | Spellman, Jr. | 324/207.25 |
| 7,069,902 | B2 * | 7/2006 | Arai et al. | 123/337 |
| 7,225,792 | B2 * | 6/2007 | Nakamura et al. | 123/337 |
| 7,328,507 | B2 * | 2/2008 | Arai et al. | 29/888.4 |
| 2005/0022787 | A1 * | 2/2005 | Arai et al. | 123/399 |
| 2014/0090494 | A1 * | 4/2014 | Schadt | 74/56 |

OTHER PUBLICATIONS

Author: Lonnie Diers, Extreme Automatics, Inc. website, Article: Extreme Automatics 2004R Install, subheading: TV Cable Adjustment, Cincinnati, OH. Found at: http://www.extremeautomatics.com/techinfo.html.

* cited by examiner

*Primary Examiner* — David M Fenstermacher (57) ABSTRACT

A system for controlling a transmission throttle valve allows the transmission response to be correlated with changes in engine torque. The apparatus described herein solves the problem of older vehicles which utilize a fuel management device having a throttle lever that contains no ready attachment point for a throttle valve control device. The apparatus includes an eccentric mount which is installed on the rotatable throttle member of a the management device. The eccentric mount is positioned so as to have an axis of rotation nominally aligned with the axis of rotation of the throttle shaft. An eccentric having an attachment point for a throttle valve cable is installed on the eccentric mount, establishing a fixed mechanism so as to correlate the rate of the transmissions throttle valve travel via displacement of the cable as the throttle member rotates the eccentric.

5 Claims, 11 Drawing Sheets

Figure 1

Prior Art

Figure 2

Prior Art

Figure 3

Prior Art

APPARATUS AND METHOD OF CONTROLLING AN AUTOMATIC TRANSMISSION THROTTLE VALVE

FIELD OF THE INVENTION

The present invention pertains generally to automobiles having automatic transmissions, and particularly to a system and method for controlling the actuation rate of the automatic transmission throttle valve.

BACKGROUND OF THE INVENTION

The throttle valve is in the generic sense a spool valve which adjusts hydraulic pressure to insure proper line pressure for the amount of torque that is being applied to the transmission clutch packs based on throttle position. In many applications, a General Motors THM 200-R4 automatic transmission, for example, a linkage comprising a throttle valve [TV] cable, connected to the accelerator pedal through the engine throttle mechanism utilizing a rotatable throttle member, communicates the rate of engine torque change to the transmission via the throttle valve, causing the throttle valve to move, opening or closing passages which modulates hydraulic pressure.

An ideal geometric relationship for communicating the engine torque to the transmission is established when the throttle valve control mechanism causes the throttle valve to move at a constant rate from idle to a full or wide open throttle position, the throttle valve control mechanism begins displacing the throttle valve at the instant the vehicle operator accelerates from idle, and finally when the vehicle is accelerated to full or wide open throttle position, the throttle valve is fully depressed to the limit of its design.

Mechanisms for controlling transmission throttle valves are well known in the art. For example, U.S. Pat. No. 4,631,983 shows a lever mechanism for a cable linkage including a control lever mounted on a rotary shaft for rotation therewith, a base plate mounted on the rotary shaft and fixed to the control lever for rotation therewith, and a lever plate adjustably assembled with the base plate and connected at one side of its outer peripheral portion to one end of the cable linkage. The lever plate is provided at its outer peripheral portion with a semicircular guide surface having a center located substantially at a rotation fulcrum of the lever plate. The cable linkage is supported on the semicircular guide surface of the lever plate. And the lever plate is displaceable on the base plate. During the assembly process, the distance between the semicircular guide surface and the rotation fulcrum is adjustable.

U.S. Pat. No. 4,711,140 illustrates an improved throttle valve regulating system for automatic transmissions for motor vehicles. The throttle valve reciprocates in a bore as a result of the action of a plunger and a throttle valve spring to control the flow and pressure of transmission fluid or oil to effect gear shifting. A rigid spacing element of predetermined length received within the throttle valve spring is provided for urging the valve towards a full throttle position in the event that the valve sticks in the bore in a lower throttle position. The system further includes a high rate spring located in the full throttle position in the bore to prevent sticking of the valve in that position, and a low rate spring similarly positioned in the bore to counteract the force of the throttle valve spring for returning the throttle valve to a low throttle or zero position. The reciprocating throttle valve includes at least one land or circumferential flange having sharpened edges for shearing large particles or other impurities introduced into the bore with the transmission fluid which might otherwise become wedged between the valve and the bore and cause sticking of the valve in a fixed position in the bore.

U.S. Pat. No. 5,046,380 defines a throttle valve operating cam of an automatic transmission and an output control member of an automotive engine that are interconnected so as to cooperate with each other by a cable consisting of an outer tube and an inner cable. The inner cable is connected to the throttle valve operating cam and the output control member. One end of the outer tube is connected first to the automatic transmission. The other end of the outer tube is regulated in position relative to a cable fitting member secured to the automotive engine and then fixed to the cable fitting member secured to the automotive engine.

U.S. Pat. No. 5,727,425 comprises a method for adjusting the throttle valve cable in an automatic transmission. In a motor vehicle automatic transmission, for example a General Motors THM 700-R4 automatic transmission, the TV cable forms part of the mechanical link between the throttle pedal, the throttle valve linkage on a fuel delivery system (e.g., a carburetor or electronic fuel injector), and the throttle valve. The TV cable is adjusted using a sleeve and spring installed at the distal end of the TV cable between the cable end clamp and a teardrop shaped cable end fitting on the TV cable. The spring opposes the movement of the cable end fitting toward the distal end of the TV cable so that the cable end fitting is at its maximum distal position only at fully open throttle. This gives the vehicle operator the shift feel of a shorter TV cable at most throttle openings. The sleeve and spring are installed only on TV cables in automatic transmission that do not have TV cable end fittings permanently attached to a throttle cam.

U.S. Pat. No. 6,855,091 defines a system which includes an adapter assembly which is mounted on the rotatable throttle member of a fuel management device. A cam assembly is selectively position able on the adapter assembly so as to adjust the rate of throttle valve cable pull. The can assembly has guide pins which move within guide slots on the adapter assembly. The cam assembly also has an adjustment slot which receives an adjustment screw connected to the adapter assembly. The cam assembly is positioned on the adapter assembly so that the adjustment screw occupies a desired location along the adjustment slot, and then the adjustment screw is tightened to lock the cam assembly in place.

Prior art addresses the need for a method of actuating the transmission throttle valve control cable in applications which did not originally accommodate a throttle valve cable [TV cable] by utilizing the lever opposite from the accelerator pedal linkage attachment to serve as an attachment point for an assembly which directly attaches to, and controls the displacement of the TV cable. Additionally, prior art fails to address issues involving physical clearance based on the configuration of the bell crank.

In view of the aforementioned limitations, there is a need for an improvement to be made to existing technology to combat these issues.

SUMMARY

The present invention solves problems related to modern transmissions which require synchronization of internal hydraulic pressure by means of an integral throttle valve with the rate of engine torque change through a cable, when installed into vehicles which were not designed to accommodate such an interface between engine and transmission.

Specifically, a problem is solved with fuel management device rotatable throttle members which were not originally of a bell crank design, that being applications where the accelerator linkage is connected to a lever attached to one half of the horizontal plane of the throttle shaft, actuating the opening or closing of the throttle shaft, while a second lever was available on the opposite side of the throttle shaft. Prior art addresses the need for a method of actuating the transmission throttle valve control cable in applications which did not originally accommodate a throttle valve cable [TV cable] by utilizing the lever opposite from the accelerator pedal linkage attachment to serve as an attachment point for an assembly which directly attaches to, and controls the displacement of the TV cable.

According to a first aspect of the invention, there is an eccentric mount attachable to the rotatable throttle member; having a center of rotation nominally aligned with the center of rotation of the throttle member. The face of the eccentric mount which engages the rotatable throttle member is relief cut such that attachment to the rotatable throttle member aligns the centers [axes] of rotation of both components. The face of the eccentric mount which engages the rotatable throttle member contains two threaded blind holes which are aligned with holes located in a throttle mounting plate [prior art], separate from but installed on the opposite side of the rotatable throttle member from the side which accepts the machine screws attached to the eccentric mount.

A second problem solved by the present invention is that close proximity of the throttle shaft horizontal plane with that of the intake manifold or other component of the engine where the fuel management device is installed precludes the use of a rotatable throttle member having a bell crank design. The configuration of the bell crank itself necessitates physical clearance below the plane of the throttle shaft to enable movement of the lever opposite the lever actuated by the accelerator pedal through a useful range of operation.

In accordance with the above aspect of the invention, the present invention provides for the eccentric mount including at least two blind holes with machine screw threads on the side which accepts an eccentric forming the throttle valve control mechanism, an eccentric having at least two through mounting holes, a throttle valve cable track, and a provision for attachment of the throttle valve cable terminal [end]. An eccentric containing a throttle valve cable track which converts rotary motion of the engine throttle device opening/closing into reciprocating motion, causing an equal amount of throttle valve displacement for each degree of throttle device opening/closing, the reciprocating motion produced by the throttle valve control mechanism being transmitted to the transmission throttle valve through a cable assembly having proximal and distal ends, said proximal end containing a barrel and lock nut adjustment housing mechanism that is accepted by the [prior art] accelerator cable bracket, while the said inner cable proximal end rotatably fixed to said eccentric at a pull point and said distal end operably connected to the transmission throttle valve.

The effective radius of the eccentric when rotated through its working range, is less than the distance from the centerline of the shaft to which the rotatable throttle member is attached to the nearest fixed object [intake manifold], that the entire operable rotation of the throttle valve control mechanism, described by the throttle member with an installed eccentric mount and eccentric, does not result in physical contact with the nearest fixed object [intake manifold or other component of] on the engine where the fuel management device is installed.

Accordingly, it is an object of the present invention to enable a method and an apparatus to enable the coordination of engine torque change with a cable actuated automatic transmission throttle valve for applications where existing solutions do not apply due to considerations [problems] stated above.

In accordance with another aspect of the invention, the system further includes the eccentric is placed in contact with the eccentric mount so that two through mounting holes align with two blind threaded holes enabling the eccentric to be positioned such that the center of eccentric is substantially on-center with the rotation axis of the eccentric mount, and by extension, the rotation axis of the throttle shaft, two machine screws engage the two through mounting holes of the eccentric and thread into the eccentric mount blind holes with matching threads are tightened to lock the eccentric to the eccentric mount.

In yet another aspect of the invention, there is a method for controlling a throttle valve cable providing a fuel management device which includes a rotatable throttle member lacking a bell crank design, having an idle state and a wide open throttle state, providing a transmission throttle valve connected to a transmission throttle valve cable, providing a system for controlling the transmission throttle valve, including:

an eccentric attachable to the rotatable throttle member, the transmission throttle valve cable connectable to the eccentric, wherein when the rotatable throttle member is rotated from the idle state to the wide open throttle state, the eccentric pulls the transmission throttle valve cable a correct cable pull distance; the eccentric having a certain radius with respect to the axis of rotation of the rotatable throttle member, wherein the eccentric determines a rate at which the throttle valve cable is pulled, the rate being linear as the rotatable throttle member is rotated from the idle state to the wide open throttle state, and, a retaining mechanism for locking the eccentric in a fixed position with respect to the rotatable throttle member, positioning the eccentric to an installed position with respect to the rotatable throttle member, using the retaining mechanism to lock the eccentric in the desired position, attaching the transmission valve throttle cable to the eccentric, causing the rotatable throttle member to rotate from the idle state to the wide open throttle state thereby pulling the transmission throttle valve cable the correct cable pull distance, observing that the rate at which the transmission throttle valve cable is pulled the correct cable pull distance results in a desired transmission shift timing, firmness, and feel. The method may further include observing that the eccentric pulls the transmission throttle valve cable the correct cable pull distance for an installed position of the eccentric with respect to the rotatable throttle member as previously described.

Other features and advantages of the present invention will become apparent from the following detailed description, taken in conjunction with the accompanying drawings, which illustrate, by way of example, the principles of the invention.

BRIEF DESCRIPTION OF DRAWINGS

Embodiments of the present invention will now be described, by way of example only, with reference to accompanying drawings, in which:

FIGS. 5a, 5b and 5c are front, edge and opposite side elevation views of the eccentric mount showing the threaded blind holes for receiving the eccentric installation screws. FIG. 5c shows the relief which receives the perimeter of the lower portion of the throttle member, causing the alignment of the eccentric mount center of rotation with the throttle shaft center of rotation [axis], and the threaded blind holes for receiving the throttle mount installation screws.

DETAILED DESCRIPTION

Figure 1:
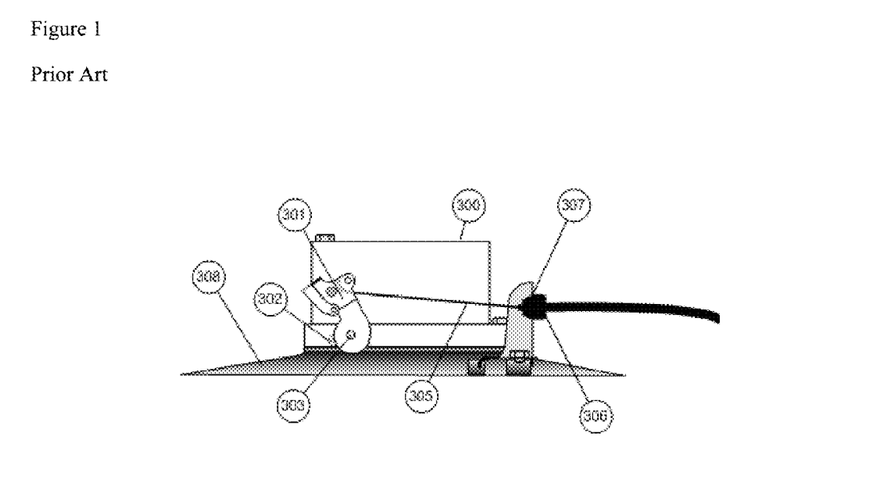
FIG. 1, labeled 'Prior Art' is a side elevation view of the fuel management device throttle member in an idle state and which throttle member has no extension or arm below the centerline of the throttle shaft and with limited clearance between the throttle member and the intake manifold.

Referring to the drawings, FIG. 1 illustrates a side elevation view of a prior art fuel management device, generally designated as 300, in an idle state. The fuel management device 300 shown is a carburetor, but the fuel management device 300 could also be a fuel injection system. Fuel management device 300 includes a rotatable throttle member. In the shown embodiment, the rotatable throttle member is a throttle linkage member 301 with throttle mount 302 which is connected to and rotates throttle shaft 303. A transmission throttle valve not shown) is connected by a throttle valve cable 30 (refer to FIG. 8) to a system for controlling an automatic transmission throttle valve in accordance with the present invention mounted on the throttle linkage member 301 using the throttle mount 302 as the attachment point.

Fuel management device 300 is mounted on an intake manifold 308 of a vehicle. In a typical embodiment, fuel management device 300 includes two butterfly valves which control the intake of air to the engine of the vehicle. The butterfly valves are connected to a throttle shaft 303. In the shown idle or low throttle position state, butterfly valves are oriented so as to block air from entering the air intake of the engine. When throttle linkage member 301 is rotated by an accelerator cable 305, throttle shaft 303 rotates and thereby rotates and opens the butterfly valves increasing the intake of air to the engine.

Figure 2:
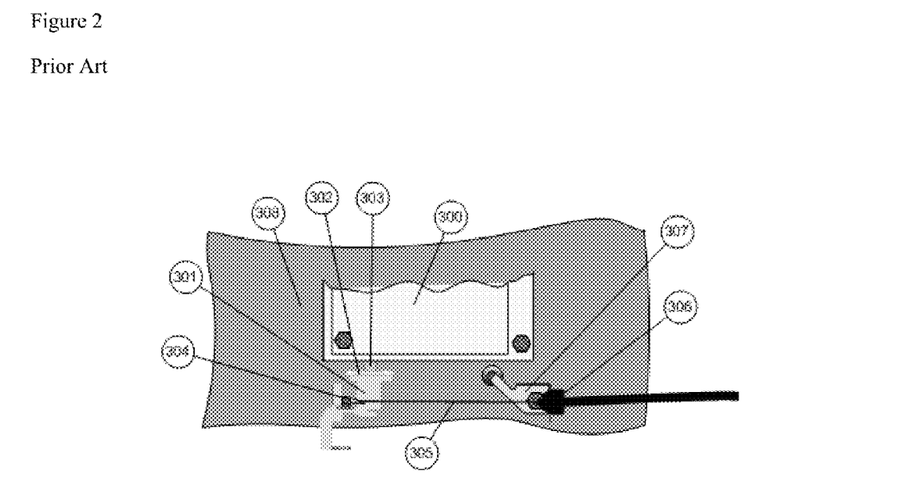
FIG. 2, labeled 'Prior Art' is a top view of the fuel management device having a throttle member with an accelerator cable attachment point, having an accelerator cable end attached. The accelerator cable housing end is attached to the accelerator cable bracket.

FIG. 2 illustrates a top view of the prior art fuel management device 300. Throttle linkage member 301 with throttle mount 302 which is connected to and rotates throttle shaft 303 is operably connected to accelerator cable 305 is shown in an idle state. The distal end of accelerator cable, accelerator cable end 304 is attached to throttle linkage member 301 through accelerator cable 305 and accelerator cable housing end 306 which is fixed to intake manifold 308 by means of accelerator cable bracket 307.

Figure 3:
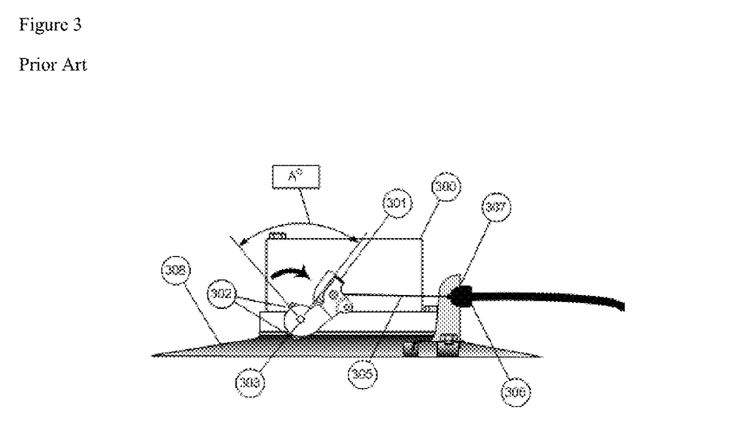
FIG. 3, labeled 'Prior Art' is a side elevation view of the prior art fuel management device throttle member rotated to a wide open throttle state, illustrated by arc 'A'. The part of the throttle member positioned above the horizontal plane of the throttle shaft remains above the horizontal throttle shaft plane throughout the range of rotation of the throttle member.

FIG. 3 illustrates a side elevation view of the prior art fuel management device 300 in a wide open throttle state. Throttle linkage member 301 with throttle mount 302 has been rotated through angle A causing throttle shaft 303 to rotate and open the butterfly valves increasing the intake of air to the engine and therefore increasing the torque output of said engine. In the shown embodiment, the rotation angle A from idle to wide open throttle is 81.19°. This angular rotation applies to one of many Quadrajet® carburetors manufactured by the Rochester Products Division of General Motors, and is used in the description of the present invention. However, it may be appreciated that other fuel management devices 300 will have a different angle A of rotation from idle to wide open throttle, yet the principles of the present invention disclosed herein may also be applied to these devices.

Figure 4:
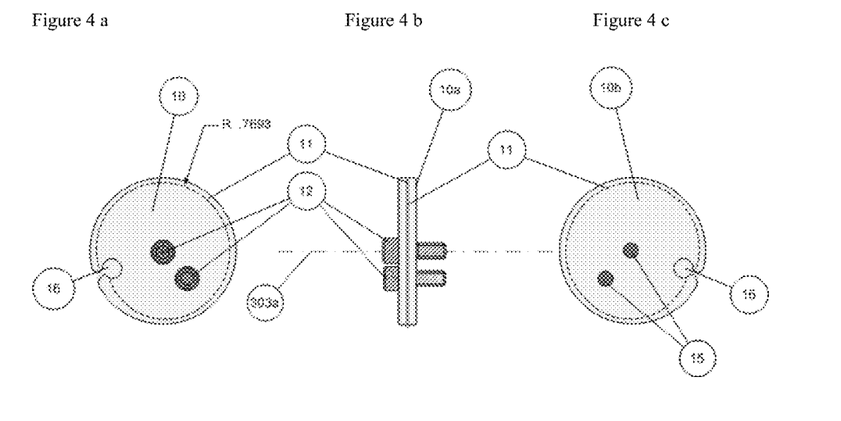
FIGS. 4a, 4b and 4c, are front, edge and opposite side elevation views of the eccentric showing the TV cable end holder, the installation screws, the TV cable track and the installation holes

FIG. 4a, is a front elevation view of the eccentric 10 of the system for controlling an automatic transmission throttle valve in accordance with the present invention showing the TV cable end attachment 16, the installation screws 12, the TV cable track 11 hidden from view but represented by a dashed line with a radius of 0.7693 inches and the installation holes.

FIG. 4b is an edge view of the eccentric 10a, showing the TV cable track 11 and two installation screws 12. The axis of rotation of eccentric 10a is aligned with the throttle shaft axis of rotation as illustrated by the broken line, 303a.

Figure 5:
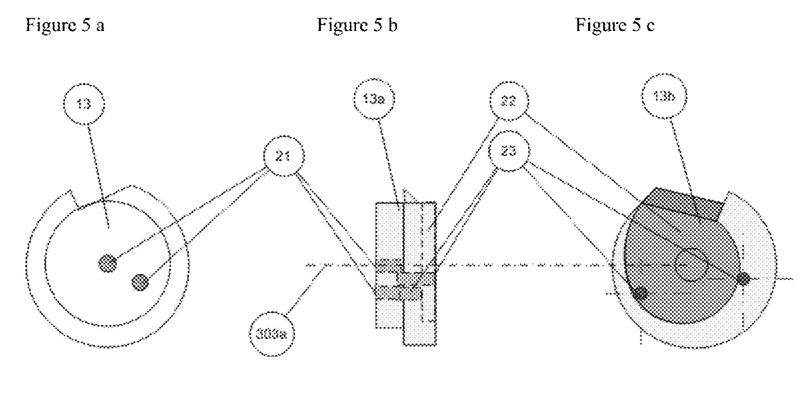

FIG. 4c is an opposite side elevation view of the eccentric, 10b showing the TV cable end attachment 16, the installation holes 15, and the TV cable track 11 which is hidden from view but is represented by a dashed line FIG. 5a is a front side elevation view of the eccentric mount 13 of the system for controlling an automatic transmission throttle valve in accordance with the present invention showing the threaded blind holes 21 for receiving the eccentric installation screws 12.

FIG. 5b is an edge view of the eccentric mount 13a showing the threaded blind holes 21 for receiving the eccentric installation screws 12 and threaded blind holes 23 for receiving the throttle mount installation screws 14. The relief 22 which receives the perimeter of throttle member 301 is hidden from view but is represented by a dashed line.

FIG. 5c is an opposite side elevation view of the eccentric mount 13b showing the relief 22 which receives the perimeter of throttle member 301, causing the alignment of the eccentric mount center of rotation with the throttle shaft center of rotation [axis] 303a, and the threaded blind throttle mount holes 23 for receiving the throttle mount installation screws 14.

Figure 6:
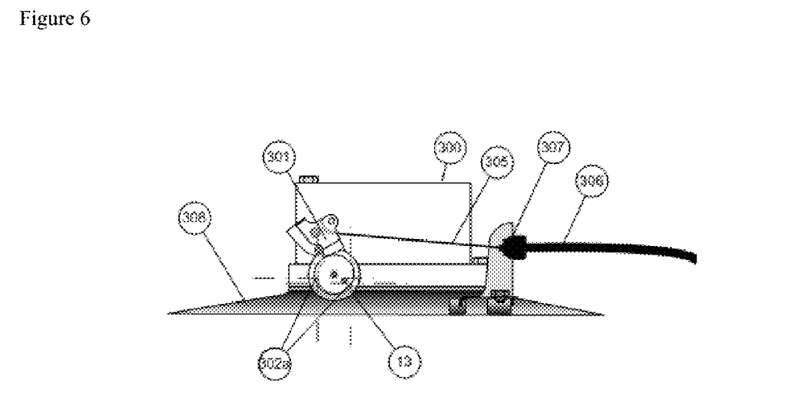
FIG. 6, is a side elevation view of the fuel management device throttle member in an idle state showing the installed position of the eccentric mount with the hidden throttle mount holes indicated by the dashed crosshair lines. The hidden throttle mount holes accept screws which have matching threads in the eccentric mount.

FIG. 6 is a side elevation view of the fuel management device throttle member 301 in an idle state showing the installed position of the eccentric mount 13 of the system for controlling an automatic transmission throttle valve in accordance with the present invention with the hidden throttle mount holes 23 indicated by the dashed crosshair lines 302a. The hidden throttle mount holes 23 accept throttle mount installation screws 14 which have matching threads in the eccentric mount 13 establishing a fixed mechanism which accepts the eccentric 10 (see FIG. 5) so as to correlate the rate of throttle rotation with that of the transmission throttle valve travel (see FIG. 8) as said throttle member 301 rotates in response to the displacement of accelerator cable 305 as the driver depresses the accelerator pedal (not shown).

Figure 7:
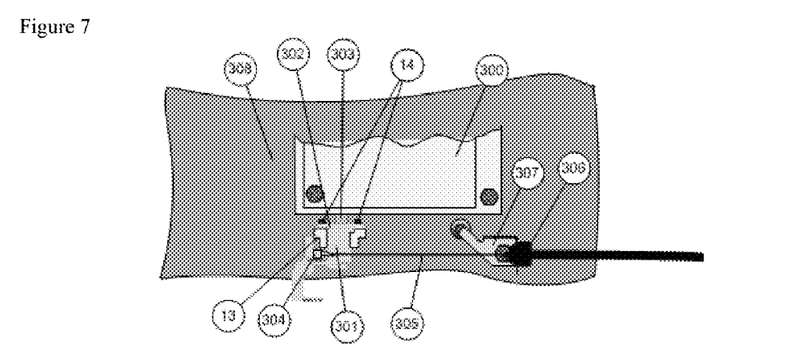
FIG. 7 is a top view of the fuel management device having a throttle member with an accelerator cable attachment point, having an accelerator cable end attached and the eccentric mount installed on the throttle member.

FIG. 7 is a top view of the fuel management device 300 having a throttle linkage member 301 with throttle mount 302 which is connected to and rotates throttle shaft 303 operably connected to accelerator cable attachment point, having an accelerator cable end 304 attached and the eccentric mount 13 installed on the throttle member 301 by throttle mount installation screws 14 which engage threaded blind throttle mount holes 23 in the eccentric mount 13 establishing a fixed mechanism which accepts the eccentric 10 (see FIG. 5) so as to correlate the rate of throttle rotation with that of the transmission throttle valve travel (see FIG. 8) as the throttle member 301 rotates in response to the displacement of accelerator cable 305 as the driver depresses the accelerator pedal (not shown). The accelerator cable end 304 attached to distal end of accelerator cable 305 and accelerator cable housing end 306 which is fixed to intake manifold by means of accelerator cable bracket 307.

Figure 8:
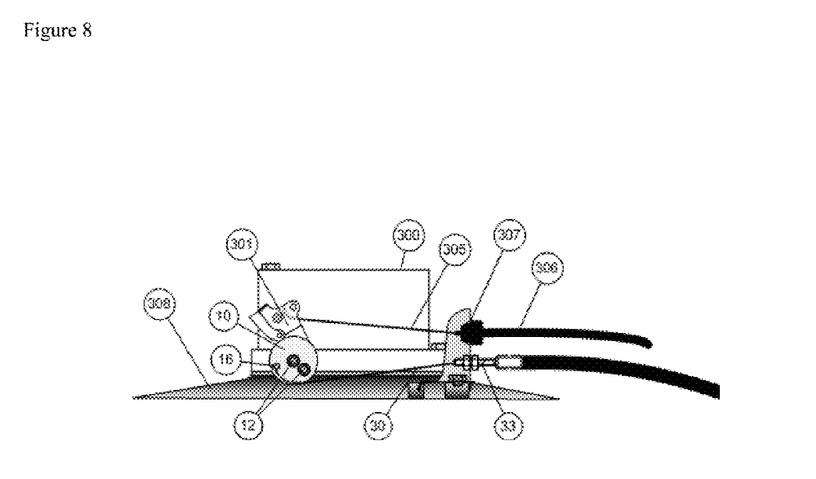
FIG. 8, is a side elevation view of a system for controlling an automatic transmission throttle valve in accordance with the present invention mounted on the throttle linkage member shown in an idle state, illustrating the clearance between the eccentric of the system and the intake manifold and the position of the proximal end of the TV cable housing on the [prior art] accelerator cable bracket.

FIG. 8, is a side elevation view of a system for controlling an automatic transmission throttle valve in accordance with the present invention mounted on the throttle linkage member 301 shown in an idle state, illustrating the clearance between the eccentric 10 of the system and the intake manifold 308 and the position of the proximal end of throttle valve cable indicated by the throttle valve cable adjuster 33 on the [prior art] accelerator cable bracket 307, said throttle valve cable inner member 30 is attached to eccentric 10 at throttle valve cable attachment 16. The throttle valve cable 30 is connected 15 to the throttle valve of an automatic transmission. For the purposes of this illustration, the throttle valve requirements of a THM-200R4 transmission available from General Motors Corporation of Detroit, Mich., are used. As with the fuel management device 300, it may be appreciated that other transmissions will have different requirements, to which the principles of the present invention may be applied. The throttle valve cable 30 used with a THM-200R4 transmission must be pulled a fixed distance 30a of 1.125 inches to move the throttle valve in the transmission from a starting point at idle to the maximum travel permitted by design at wide open throttle.

Figure 9:
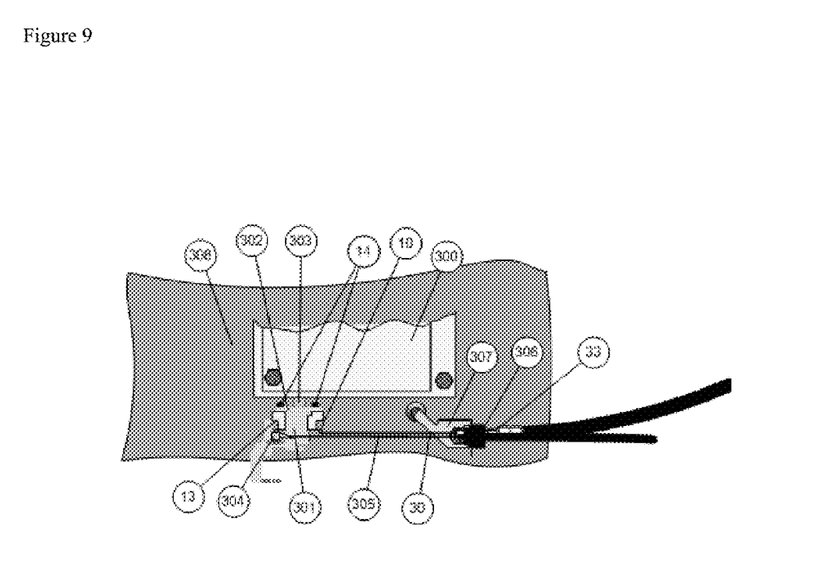
FIG. 9 is a top view of a system for controlling an automatic transmission throttle valve in accordance with the present invention mounted on the throttle linkage member shown in an idle state.

FIG. 9 is a top view of the fuel management device 300 having a throttle linkage member 301 with throttle mount 302 which is connected to and rotates throttle shaft 303 operably connected to accelerator cable attachment point, having an accelerator cable end 304 attached and the eccentric mount 13 installed on the throttle member 301 by throttle mount installation screws 14 which engage threaded blind throttle mount holes 23 in the eccentric mount 13 and the eccentric 10 installed on the eccentric mount 13 by eccentric installation screws 12 (not shown) accepts the throttle valve cable end 31 in throttle valve cable end attachment 16 (shown in FIG. 4) establishing a fixed mechanism which correlates the rate of throttle rotation with that of the transmission throttle valve travel (see FIG. 8) as the throttle member 301 rotates in response to the displacement of accelerator cable 305 as the driver depresses the accelerator pedal (not shown). The accelerator cable end 304 attached to distal end of accelerator cable 305 and accelerator cable housing end 306 and the throttle valve cable end 31 attached to proximal end of throttle valve cable inner member 30 and throttle valve cable adjuster 33 both of which are fixed to intake manifold by means of accelerator cable bracket 307.

Figure 10:
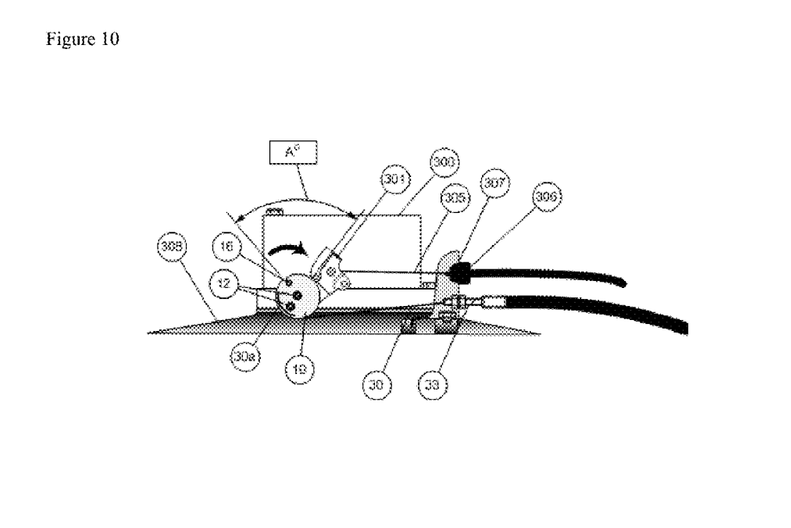
FIG. 10 is a side elevation view of the system and throttle linkage member of FIG. 8 rotated to the wide open throttle state; and illustrating the mechanical displacement of the throttle valve cable at the wide open throttle state of said throttle linkage member.

FIG. 10 illustrates a side elevation view of the prior art fuel management device 300 in a wide open throttle state. The eccentric mount 13 installed on the throttle member 301 by throttle mount installation screws 14 which engage threaded blind throttle mount holes 23 in the eccentric mount 13 and the eccentric 10 installed on the eccentric mount 13 by eccentric installation screws 12. Eccentric accepts the throttle valve cable end 31 in throttle valve cable end attachment 16 (shown in FIG. 4) establishing a fixed mechanism which correlates the rate of throttle rotation with that of the transmission throttle valve travel (see FIG. 8) as the throttle member 301 rotates in response to the displacement of accelerator cable 305 as the driver depresses the accelerator pedal (not shown). The accelerator cable end 304 attached to distal end of accelerator cable 305 and accelerator cable housing end 306 and the throttle valve cable end 31 attached to proximal end of throttle valve cable inner member 30 and throttle valve cable adjuster 33 both of which are fixed to intake manifold by means of accelerator cable bracket 307.

Throttle linkage member 301 with throttle mount 302 containing the system for controlling an automatic transmission throttle valve in accordance with the present invention has been rotated through angle A causing throttle shaft 303 to rotate to the wide open throttle position resulting in the displacement of TV cable 30 in the amount of 1.125 inches shown by arc 30a. In the shown embodiment, the rotation angle A from idle to wide open throttle is 81.19°. This angular rotation applies to one of many Quadrajet® carburetors manufactured by the Rochester Products Division of General Motors, while the displacement produced from this angular rotation is 1.125 inches, as required by one of many throttle valve designs used in THM 2004R General Motors transmissions, and is used in the description of the present invention. This design provides a linear pulling action over the range of throttle member 301 rotation from idle to wide open throttle. However, it may be appreciated that other fuel management devices 300 will have a different angle A of rotation from idle to wide open throttle, and other transmissions may have different throttle valve displacement requirements, yet the principles of the present invention disclosed herein may also be applied to these devices.

Figure 11:
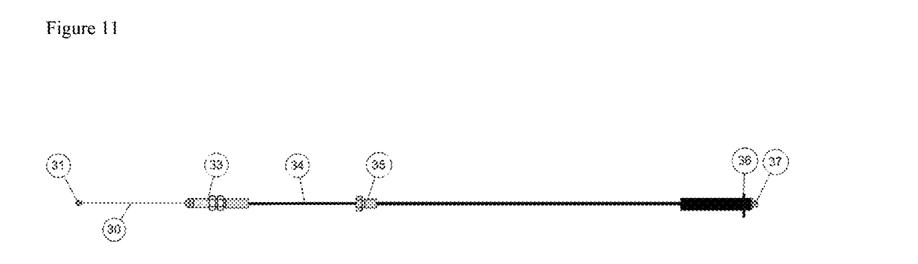
FIG. 11 is a side elevation view of the throttle valve cable assembly having proximal end containing a barrel and lock nut cable housing adjustment provision [mechanism] that is accepted by the [prior art] accelerator cable bracket.

FIG. 11 is a side elevation view of the throttle valve cable assembly having a proximal end consisting of throttle valve cable end 31 permanently affixed to the throttle valve cable inner member 30 of a length suitable to enable the distal end containing permanently affixed throttle valve connector eye 37 to connect to the transmission throttle valve (not shown). Throttle valve cable inner member 30 operates within throttle valve cable housing 34 of a length suitable to limit the overall physical displacement of throttle valve cable inner member 30 to a total of 1.125 inches, the length of the arc of throttle valve cable displacement 30a. The arc of throttle valve cable inner member displacement 30a is measured when throttle valve cable adjuster 33 is mounted on accelerator cable mounting bracket 307 (not shown) and throttle valve cable housing transmission mount 37 is installed on the transmission (not shown); and throttle valve cable housing adjuster 35 are set at installation to maintain the requisite overall throttle cable housing length to the distance between the accelerator cable bracket 307 and the transmission TV cable installation point. The throttle valve cable inner member 30 length is calculated by adding the distance from the accelerator cable bracket 307 to the TV cable end attachment 16 to the total length of throttle valve cable housing when throttle member 301 is at the idle position and the transmission throttle valve is also at the beginning of its designed range of displacement.

Figure 12:
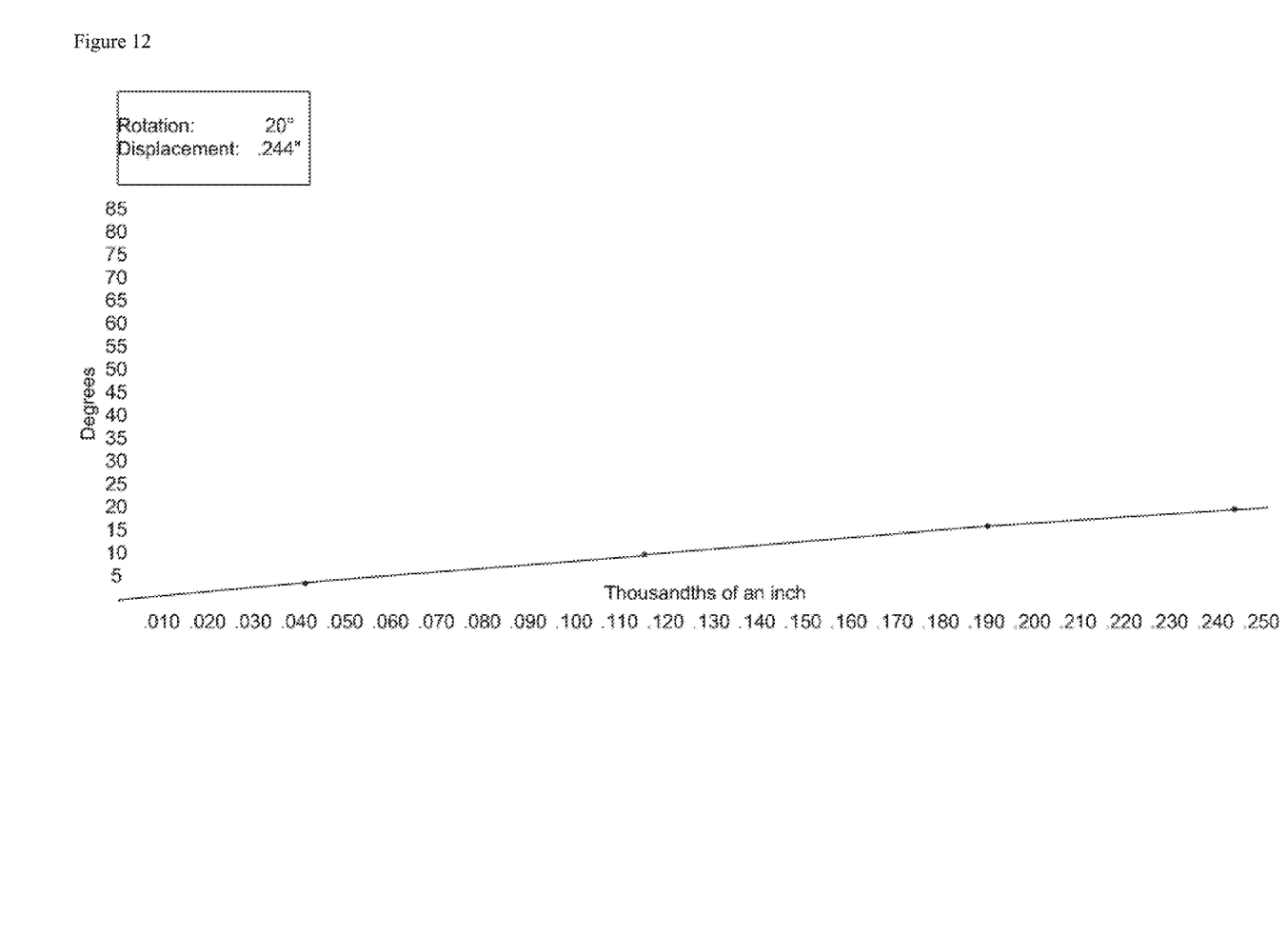
FIG. 12 is a graph showing cable displacement in relation to 20 degrees of rotatable throttle member rotation at intervals of 5 degrees.

FIG. 12 is a chart illustrating the throttle valve cable distal end displacement at each 5 degrees of throttle member rotation from idle position to 20 degrees, for a linear displacement of 0.244 inch.

Figure 13:
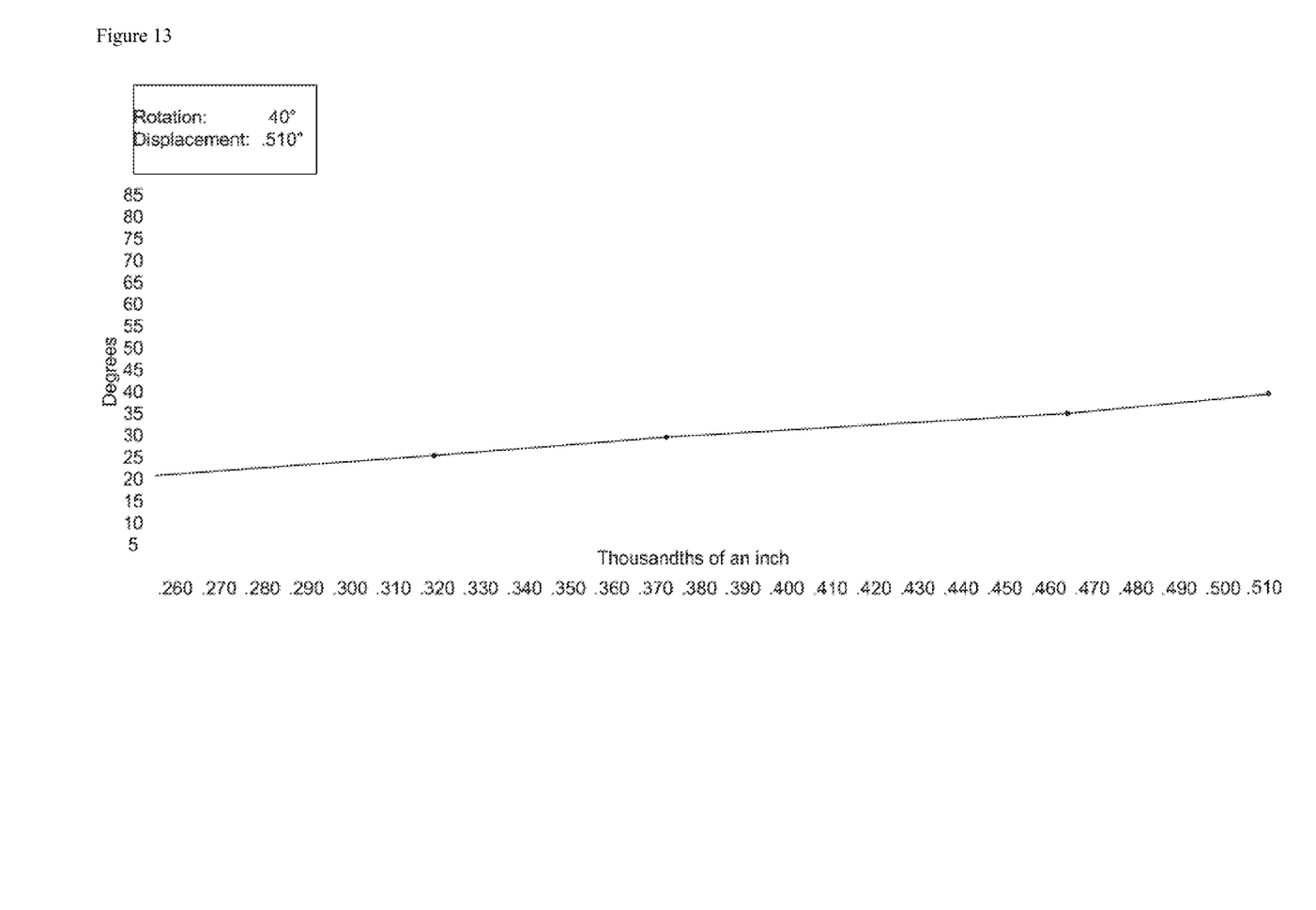
FIG. 13 is a graph showing cable displacement in relation to 40 degrees of rotatable throttle member rotation at intervals of 5 degrees.

FIG. 13 is a chart illustrating the throttle valve cable distal end displacement at each 5 degrees of throttle member rotation from 21 degrees to 40 degrees, for a cumulative linear displacement of 0.510 inch.

Figure 14:
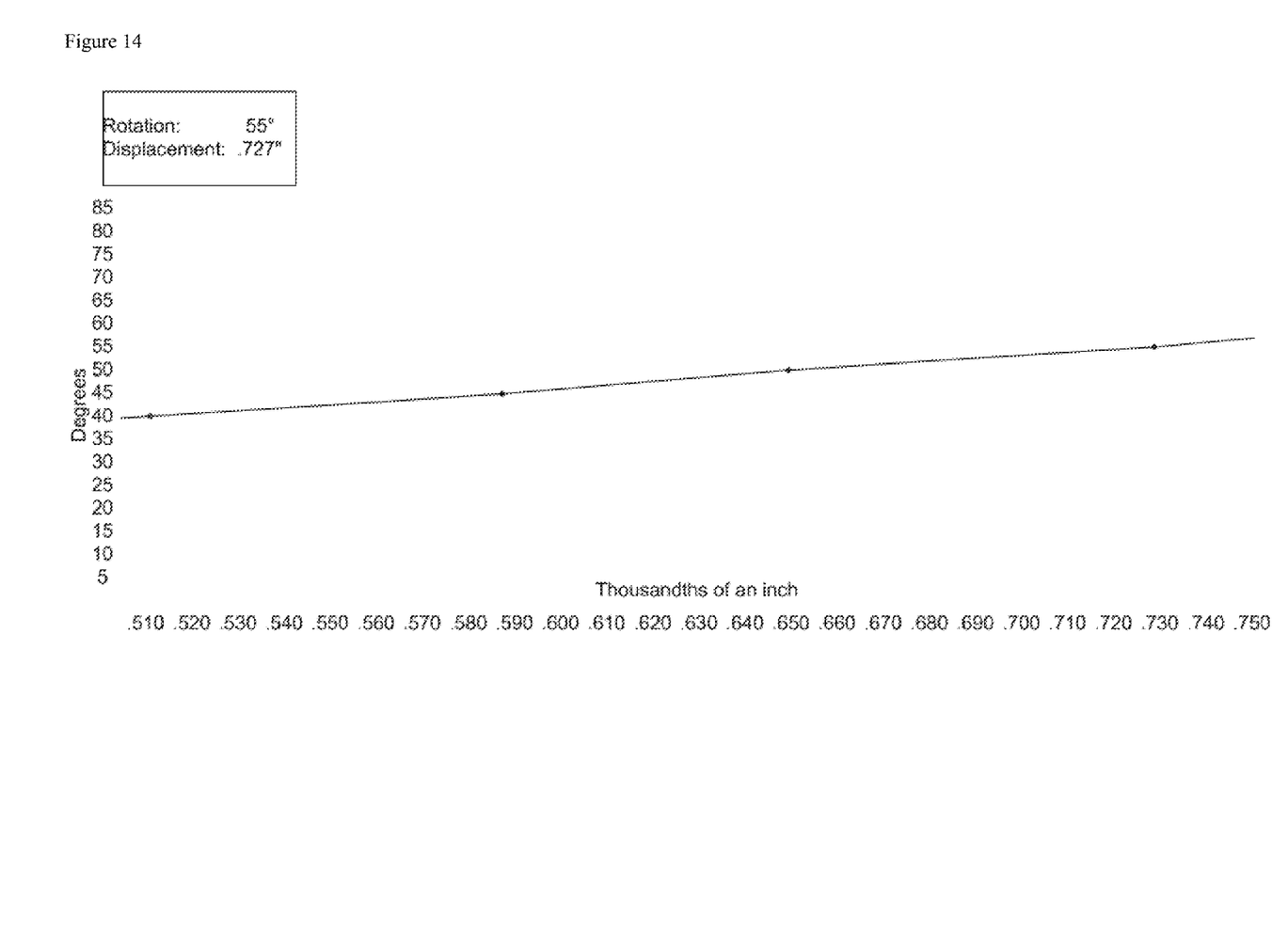
FIG. 14 is a graph showing cable displacement in relation to 55 degrees of rotatable throttle member rotation at intervals of approximately 5 degrees.

FIG. 14 is a chart illustrating the throttle valve cable distal end displacement at each 5 degrees of throttle member rotation 41 degrees to 55 degrees, for a cumulative linear displacement of 0.727 inch.

Figure 15:
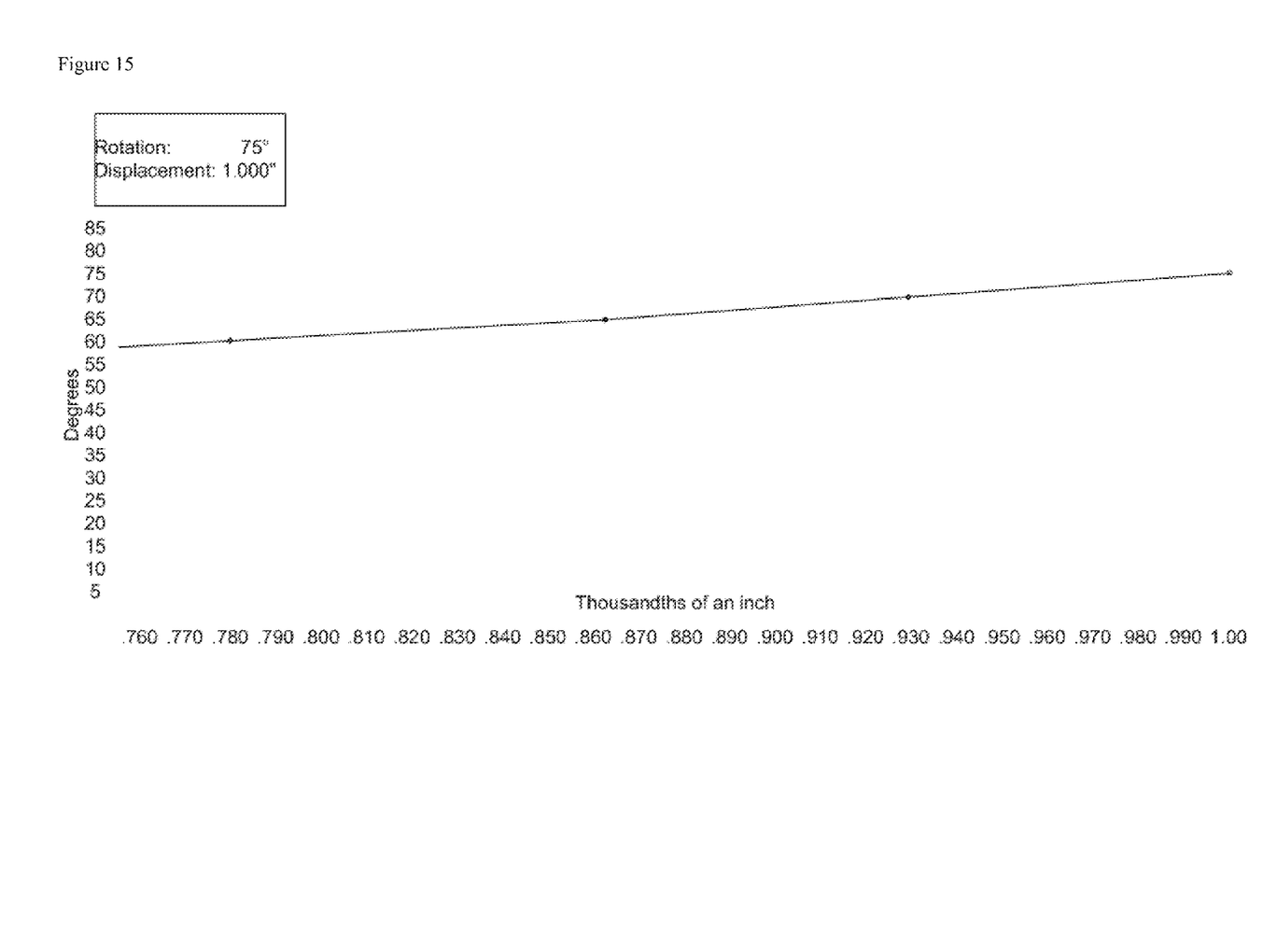
FIG. 15 is a graph showing cable displacement in relation to 75 degrees of rotatable throttle member rotation at intervals of 5 degrees.

FIG. 15 is a chart illustrating the throttle valve cable distal end displacement at each 5 degrees of throttle member rotation from 60 degrees to 75 degrees, for a cumulative linear displacement of 1.000 inch.

Figure 16:
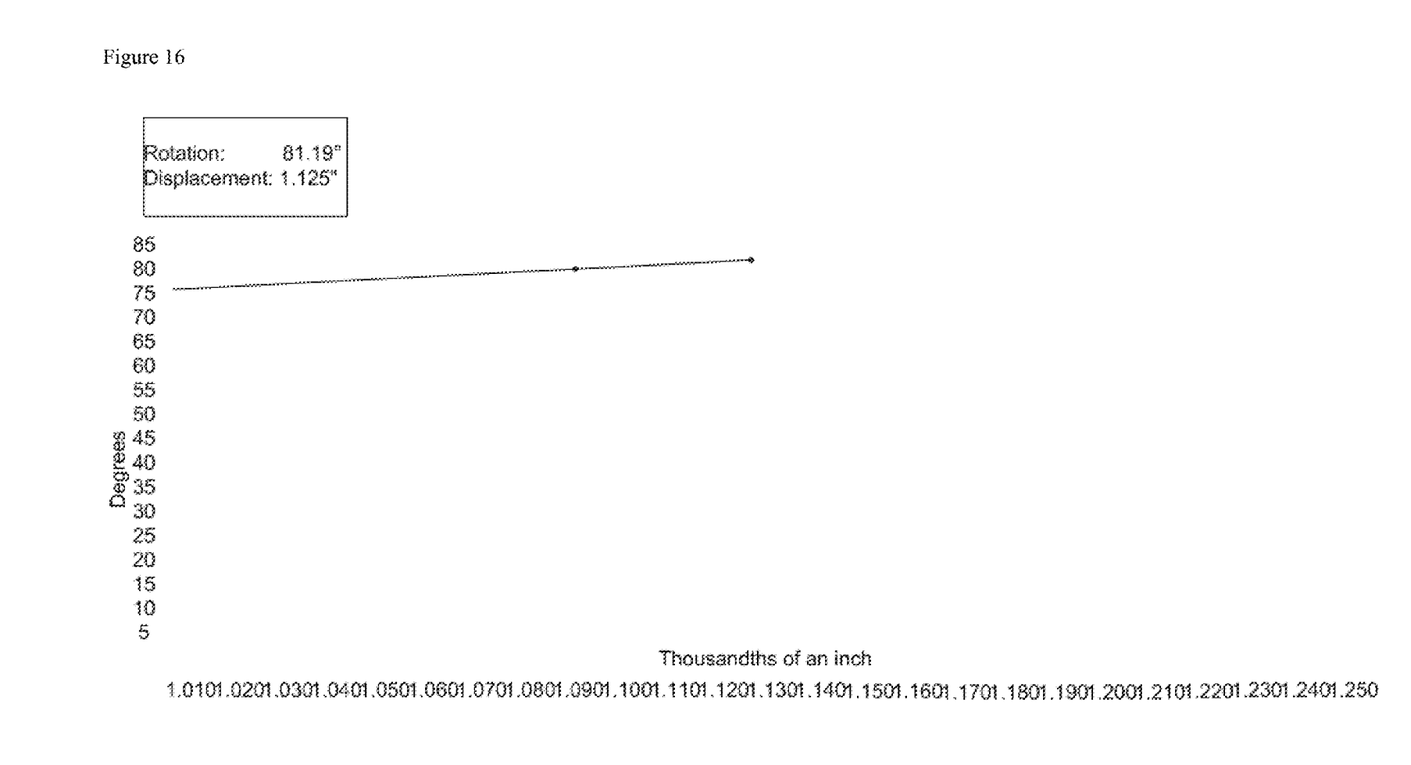
FIG. 16 is a graph showing maximum cable displacement of 1.125" in relation to a total of 81.19 degrees of rotatable throttle member rotation of approximately 5 degree intervals.

FIG. 16 is a chart illustrating the throttle valve cable distal end displacement at each 5 degrees of throttle member rotation from 76 degrees to wide open throttle position, at approximately 81.19 degrees, for a cumulative linear displacement of 1.125 inches.

What is claimed is:

1. An apparatus for controlling an automatic transmission throttle valve comprising a throttle member eccentric mount and a transmission throttle valve eccentric being attached to a rotatable throttle member of a fuel management device, said throttle member eccentric mount being cylindrical and having two opposing faces, wherein a first face is relief cut in the shape of the periphery of the rotatable throttle member attachment plate being fixedly attached to the primary throttle shaft of said fuel management device such that the throttle member eccentric mount first face accepts the physical periphery of the rotatable throttle member attachment plate preventing translation of movement and causing the second face to be located outboard from the primary throttle shaft end and parallel to the rotatable throttle member of said fuel management device, the second face being the attachment point for the transmission throttle valve eccentric, the transmission throttle valve eccentric having an axis of rotation aligned with axis of rotation of the rotatable throttle member establishing a fixed mechanism which, in combination with a transmission throttle valve cable assembly having one end pivotally connected to said transmission throttle valve eccentric, and the opposite end operably attached to the transmission throttle valve, converts rotary motion of the rotatable throttle member into a reciprocating motion causing an equal amount of transmission throttle valve displacement for each degree of throttle member movement in response to changes in the vehicle operator's accelerator inputs between the idle throttle and the wide open throttle states.

2. The apparatus as defined in claim 1 wherein the reciprocating motion is transmitted to the transmission throttle valve through a transmission throttle valve cable assembly having a proximal end and a distal end, the proximal end containing a barrel and lock nut adjustment housing mechanism that is fixedly attached to a fixed stationary mounting near said fuel management device, while an inner cable member proximal end is pivotally connected to the transmission throttle valve eccentric at a pull point and the distal end is operably connected to the transmission throttle valve.

3. The apparatus as defined in claim 2, further comprising a throttle valve cable housing containing a barrel and lock nut adjustment housing mechanism and inner cable member forming a mechanical linkage between the rotatable throttle member, the transmission throttle valve eccentric, and the transmission throttle valve, where the barrel and lock nut adjustment housing mechanism is the throttle valve cable proximal attachment, and said barrel and lock nut adjustment applies a consistent predetermined force between said throttle valve cable housing and said throttle valve inner cable member to avoid slackening of said throttle valve inner cable member.

4. The apparatus as defined in claim 1 wherein said transmission throttle valve eccentric is disk-like with an arcuate cam surface, formed by annular groove on the peripheral edge thereof, having opposing faces, wherein a first face is a solid planar structure fixedly attached to a second face of said throttle member eccentric mount, having a void interrupting the peripheral annular groove for pivotal capture and retention of the transmission throttle valve cable inner member proximal end, said transmission throttle valve eccentric having a diameter that maintains a consistent relationship between primary throttle shaft rotation from 0° to about 80° from idle to the wide open throttle position and transmission throttle valve opening and closing, insuring proper line pressure for the amount of torque being applied to the transmission clutch packs.

5. The apparatus as defined in claim 1 wherein the throttle member eccentric mount and the transmission throttle valve eccentric are manufactured as a single component from an alloy, or a glass fiber reinforced grade injection molding polyamide having heat resistance up to about 260° C. and minimum tensile modulus of about 10,700 MPa at about 23° C.

* * * * *